(12) United States Patent
Kawai

(10) Patent No.: US 7,133,469 B2
(45) Date of Patent: Nov. 7, 2006

(54) QUADRATURE DEMODULATOR

(75) Inventor: Masahiro Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 651 days.

(21) Appl. No.: 10/208,841

(22) Filed: Aug. 1, 2002

(65) Prior Publication Data
US 2003/0026358 A1 Feb. 6, 2003

(30) Foreign Application Priority Data
Aug. 3, 2001 (JP) .............................. 2001-236523

(51) Int. Cl.
H04L 27/14 (2006.01)

(52) U.S. Cl. ...................... 375/324; 375/371
(58) Field of Classification Search ................ 375/226, 375/322, 333, 346, 349, 354, 371, 350; 329/300, 329/302, 304, 306, 307
See application file for complete search history.

(56) References Cited

U.S. PATENT DOCUMENTS

| | | | |
|---|---|---|---|
| 4,985,900 A * | 1/1991 | Rhind et al. ................ | 375/226 |
| 6,034,564 A * | 3/2000 | Iwamatsu .................... | 329/306 |
| 6,222,891 B1 | 4/2001 | Liu et al. | |
| 6,339,623 B1 | 1/2002 | Iwamatsu | |
| 6,363,124 B1 * | 3/2002 | Cochran ..................... | 375/326 |
| 6,442,383 B1 * | 8/2002 | Iemura ....................... | 455/312 |

FOREIGN PATENT DOCUMENTS

| | | |
|---|---|---|
| JP | 06-58794 | 3/1994 |
| JP | 07-297872 | 11/1995 |
| JP | 08-274832 | 10/1996 |
| JP | 11-146028 | 5/1999 |
| JP | 2000-41074 | 2/2000 |
| JP | 2001-24724 | 1/2001 |
| WO | WO00/65794 | 11/2000 |
| WO | WO 01/26316 A1 | 4/2001 |

OTHER PUBLICATIONS

Japanese Office Action dated Jan. 22, 2004, with partial English translation.
European Search Report dated Jul. 24, 2006.

* cited by examiner

Primary Examiner—Don N. Vo
(74) Attorney, Agent, or Firm—McGinn IP Law Group,PLLC

(57) ABSTRACT

In case that a difference between a frequency of an input signal, which has been subjected to a quadrature modulation, and a frequency of an oscillator is large, a center of spectrum of a mixer output signal shifts, and strays from a pass band of a roll-off filter. As a result deterioration of a bit error rate characteristic is leading. A phase rotator is provided at a front stage of the roll-off filter, and a phase rotation operation of the phase rotator allows a base band signal to transmit through the pass band of the roll-off filter. Moreover, in a state where a carrier synchronization is not established, a signal which changes its frequency by a range in accordance with an amplitude of a periodic waveform signal is output to the phase rotator, and a central frequency of the base band signal is swept by the phase rotator, whereby the base band signal transmits through the pass band of the roll-off filter.

20 Claims, 10 Drawing Sheets

QUADRATURE DEMODULATOR

BACKGROUND OF THE INVENTION

1. Field of the Invention

The present invention relates to a quadrature demodulator used for a digital radio communication system and the like.

2. Description of the Related Art

FIG. 9 is a block diagram showing a conventional quadrature demodulator. In FIG. 9, reference numeral 101 denotes a quadrature detector, and reference numeral 102 denotes an oscillator. An input signal that has been subjected to a quadrature modulation, that is, an input intermediate frequency signal (hereinafter referred to as an input IF signal), is converted to two quadrature components Ich1 and Qch1 by the quadrature detector 101 and the oscillator 102. Two outputs from the quadrature detector 101 are respectively converted to digital signals Ich3 and Qch3 by an A/D converter 103, and then output to an ROF (roll-off filter) 105. The signals which have been transmitted through the ROF 105 are output to a phase-rotator 104.

Herein, the phase-rotator 104, a PD (phase error detector) 108, a LPF (loop filter) 109, an adder 112 and a NCO (numerically controlled oscillator) 110 constitute a PLL (phase locked loop). In a state where carrier synchronization is not established, a signal indicating an asynchronous state is output from a synchronization detector 107 to a frequency controller 111. In the asynchronous state, the frequency controller 111 outputs a frequency signal such as a triangular wave to the adder 112.

On the other hand, a phase difference between the input IF signal and the output of the oscillator 102 is detected in the PD 108, and high frequency components are removed by the LPF 109. The signal from which the high frequency components are removed by the LPF 109 is output to the adder 112.

The adder 112 adds the output of the frequency controller 111 to the output of the LPF 109, and outputs the results to the NCO 110. The NCO 110 outputs sinusoidal signals (Sin ωt and cos ωt) to the phase-rotator 104, and said sinusoidal signals change their frequencies in accordance with the signal input to the NCO 110. The phase-rotator 104 performs a complex multiplication by use of the output of the ROF 105 and the output of the NCO 110, and performs a phase rotation so as to correct the phase shift between the input IF signal and the output of the oscillator 102. When the carrier synchronization is established, the value of the output of the frequency controller 111 at that time is kept, and the output of the frequency controller 111 is supplied to the NCO 110 via the adder 112.

In such a quadrature demodulator, when the difference between the frequency of the input IF signal and the frequency of the oscillator 102 becomes large, the center of spectrum of a mixer output signal shifts as shown by the broken lines of FIG. 6, and deviates from the pass band of the ROF 105. For this reason, data whose frequency deviates from the band of the ROF 105 vanishes, and deterioration of a bit error rate characteristic or the like is incurred as a result.

As a method to solve the deterioration, for example, a structure is conceived, in which the ROF 105 is arranged on the output side of the phase-rotator 104 as shown in FIG. 10. However, in this structure, the ROF 105 is arranged in the PLL composed of the phase-rotator 104, the PD 108, the LPF 109, the adder 112 and the NCO 110. As the ROF 105, a digital filter is usually used. Since a delay exists between a signal input of the ROF 105 and a signal output of the ROF 105, this PLL has a larger delay than the PLL in the demodulator of FIG. 9, therefore noises caused by the loop itself becomes much, and deteriorates the error rate characteristic. If a noise band width of the loop was narrowed in order to suppress the noises in the loop itself, a deterioration of the error rate characteristic would be essentially inevitable due to phase noises of the oscillator 102 and the like.

And above-mentioned conventional quadrature demodulators are disclosed in Japanese Patent Application Laid-open Publication No. 2000-41074, "Demodulator" (Inventor: Eisaku Sasaki).

SUMMARY OF THE INVENTION

The present invention is made from the viewpoint of the foregoing problems of the prior art. An object of the present invention is to provide a quadrature demodulator which is capable of preventing deterioration of characteristics such as a bit error rate even when a shift between a frequency of an input IF signal and a frequency of an oscillator is large.

A quadrature demodulator of the present invention comprises an oscillator for generating a signal having a predetermined frequency; a quadrature detector for converting an input IF signal to a base band signal by inputting the input IF signal and a signal of the oscillator; a roll-off filter having a predetermined pass band characteristic for shaping the base band signal; and a first phase rotator for performing a phase rotation so as to cancel a frequency shift between the frequency of the oscillator and a frequency of the input IF signal by inputting the base band signal which has transmitted through the roll-off filter, wherein a second phase rotator is provided at a former stage of the roll-off filter, and the base band signal transmits through a pass band of the roll-off filter by a phase rotation operation of the second phase rotator.

DETAILED DESCRIPTION OF THE PREFERRED EMBODIMENTS

Embodiments of the present invention will be described with reference to the accompanying drawings below.

[First Embodiment]

Figure 1:
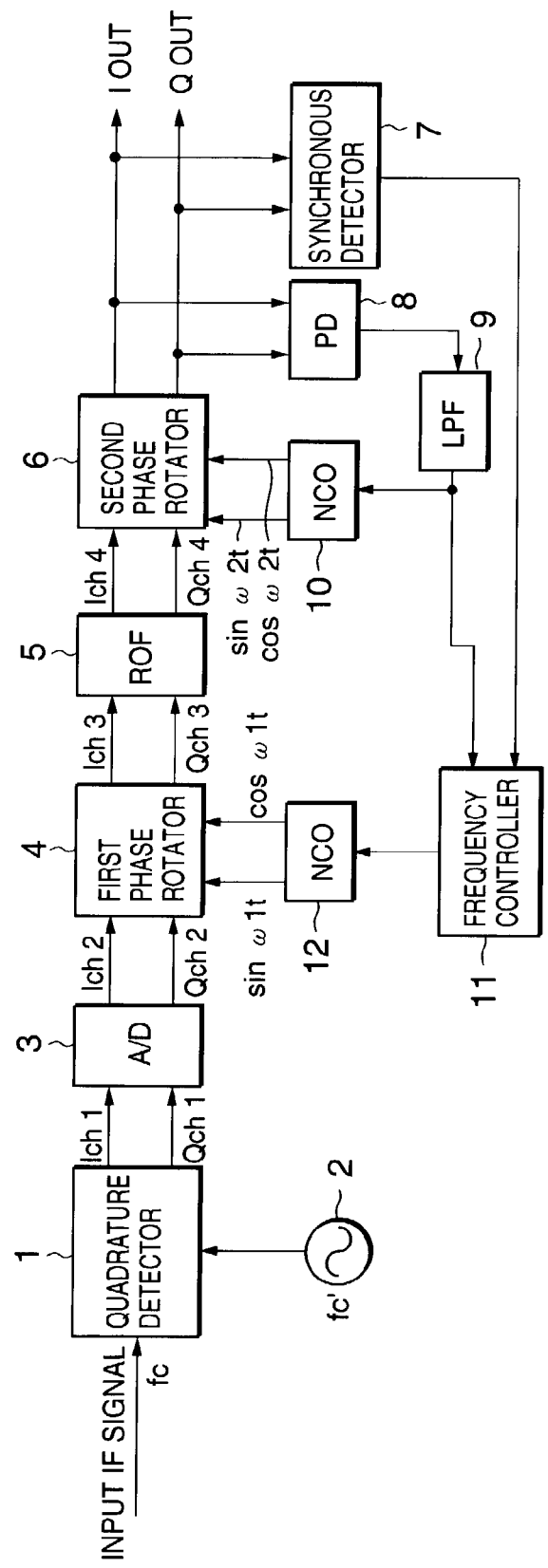
FIG. 1 is a block diagram showing a first embodiment of a quadrature demodulator according to the present invention.

FIG. 1 is a block diagram showing a first embodiment of a quadrature demodulator according to the present invention. Note that an input signal in this embodiment is an output signal of a quadrature demodulation system such as a QAM (quadrature amplitude modulation) modulator. In FIG. 1, reference numeral 1 denotes a quadrature detector, and reference numeral 2 denotes an oscillator which generates a signal of a predetermined frequency (reference carrier wave). The quadrature-modulated input signal (an input IF signal) is input to the quadrature detector 1, and the quadrature detector 1 multiplies the IF signal with the signal of the oscillator 2 for converting the multiplied signal to a base band signal. In this embodiment, a first phase rotator 4 is provided at the front stage of a ROF (roll-off filter) 5 as described later. By a coarse adjustment of the frequency shift which is performed in the first phase rotator 4, if there is a large shift between the frequency fc of the input IF signal and the frequency fc' of the oscillator 2, the base band signal passes through the pass band of the roll-off filter 5.

Herein, two quadrature components of the base band signal shall be denoted as Ich and Qch. And the method of the detection is a quasi-synchronous detection. Therefore, an output signal of the oscillator 2 (reference carrier wave) is not synchronized with the carrier wave of the input IF signal. An A/D converter 3 converts analog signals Ich1 and Qch1 to digital signals Ich2 and Qch2 for performing subsequent process digitally. A NCO (numerically controlled oscillator) 12 is a sinusoidal oscillator for generating a sinusoidal signal which changes its frequency in accordance with a magnitude of an output signal of a frequency controller 11 as described later. Then, the frequency controller 11 is controlled based on an output of a second phase rotator 6 via a synchronous detector 7 as described later. And a phase rotation of the first phase rotator 4 is controlled by the above-mentioned loop (first loop) which a loop from the second phase rotator 6 to an output terminal of the NCO 12. Moreover, the NCO 12 outputs signals having phases different by $\pi/2$, which correspond to $\sin \omega t$ and $\cos \omega t$. However, the quasi-synchronous detection is not limited to the above-described method. For example, a method in which a quadrature detection is digitally performed after performing the A/D conversion to the input IF signal can be applied to the present invention.

The first phase rotator 4 is connected to the A/D converter 3 and the NCO 12, and input signals (Ich2, Qch2) from the A/D converter 3 and signals ($\cos \omega t$, $\sin \omega t$) from the NCO 12. In the first phase rotator 4, they are regarded as complex number like Ich2+jQch2 and $\cos \omega t + j \sin \omega t$, and performed a complex multiplication.

Figure 2:
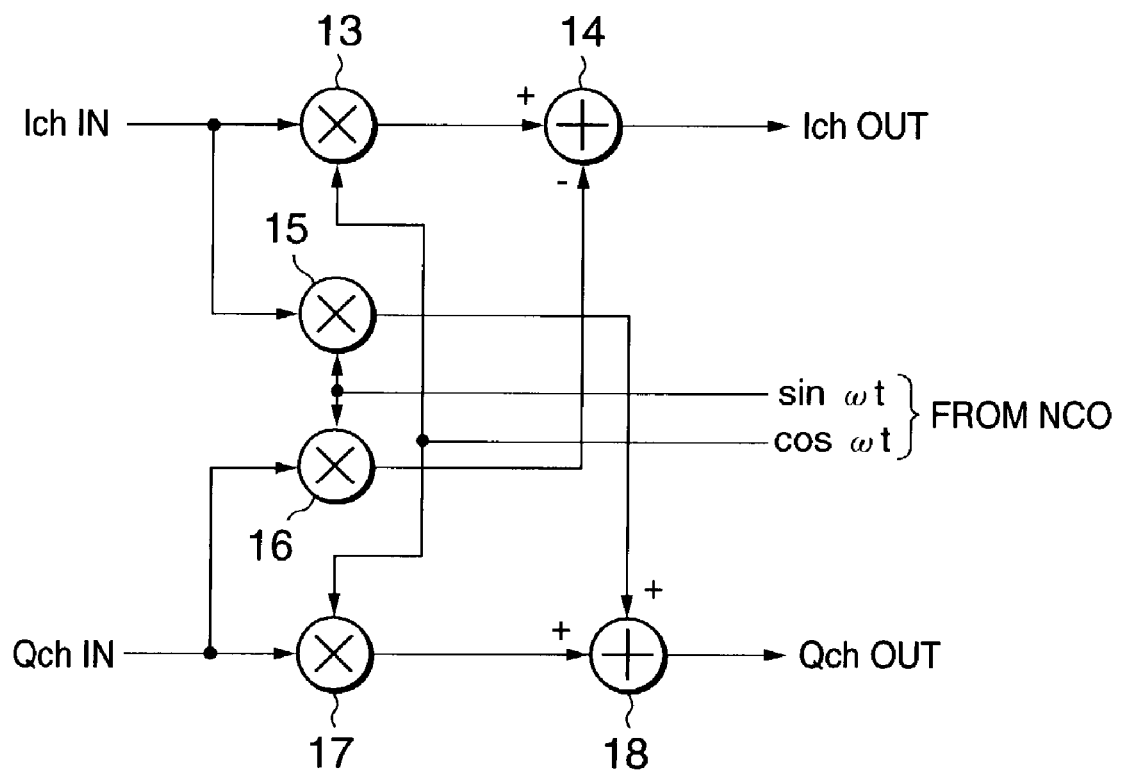
FIG. 2 is a circuit diagram showing an example of a first phase rotator in FIG. 1.

An example of a constitution of the first phase rotator 4 is shown in FIG. 2. The first phase rotation 4 includes multipliers, 13, 15, 16 and 17 and adders 14 and 18, and performs the multiplications by use of the signals (Ich2, Qch2) which are input from the A/D converter 3 and the signals ($\cos \omega t$, $\sin \omega t$) which are input from the NCO 12, which are expressed by the following equations.

$$Ich3 = Ich2 \times \cos \omega t + Qch2 \times \sin \omega t \qquad (1)$$

$$Qch3 = Ich2 \times \sin \omega t - Qch2 \times \cos \omega t \qquad (2)$$

These calculations correspond to a rotation operation in which a point expressed by Ich2 and Qch2 on a complex plane is rotated by $\omega t$ radians around the origin. In terms of a frequency region, this corresponds to shifting of input spectrum of the complex multiplier (first phase rotator 4) by $\omega$.

The ROF 5 is a roll-off filter which performs waveform shaping on a receiving side. This filter is constituted by a digital filter, and there are various constitutions of the filter. Since the digital filter has been known widely, detailed descriptions are omitted herein. Note that in the digital filter, in accordance with the number of taps a delay occurs between the input of the signal and the output thereof.

The second phase rotator 6 has the same constitution as that of the first phase rotator 4, and performs a complex multiplication of Ich4 and Qch4 that are the output of the ROF 5 with $\sin \omega t$ and $\cos \omega t$ that are the output of the NCO (numerically controlled oscillator) 10. This complex multiplication is performed based on the equations (1) and (2). The synchronous detector 7 is a circuit which detects whether the carrier synchronization is established, and any method can be used as long as the detector 7 is capable of detecting the carrier synchronization. Herein, the synchronous detector 7 outputs "1" when the detector 7 detects that the carrier synchronization is established, and outputs "0" when the detector 7 decides that the carrier synchronization is not established.

Figure 3:
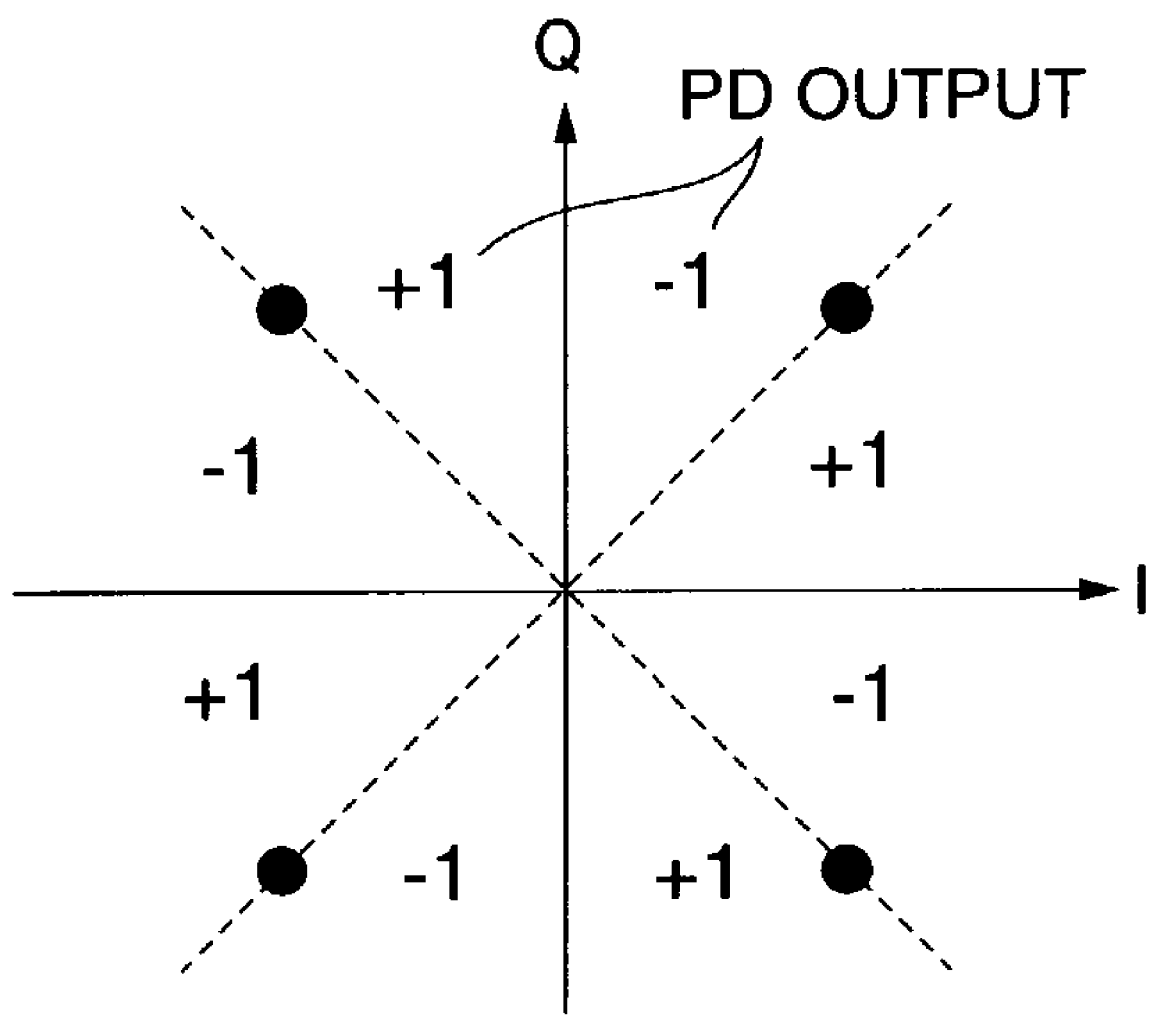
FIG. 3 is a diagram for explaining a phase error detection operation of a PD in FIG. 1.

The PD (phase error detector) 8 detects the phase error of the demodulated signal, and may be capable of simply detecting whether the phase advances or delays. For example, the PD 8 may operate in such a manner that if the phase advances as shown in FIG. 3, the PD 8 outputs "+1" and, if the phase delays, the PD outputs "−1". Alternatively, the PD 8 may output a continuous output in accordance with the magnitudes of the advance and delay of the phase.

The LPF 9 is a loop filter for removing high frequency components of the phase error signal output from the PD 8. The NCO (numerically controlled oscillator) 10 is an oscillator for generating a sinusoidal signal which changes its frequency in accordance with the magnitude of the phase error signal output from the LPF 9. The output of the LPF 9 is controlled based on the output of the second phase rotator 6 via the PD 8. And the phase rotation of the second phase rotator 6 is controlled by the above-mentioned loop (second loop) which is a loop from the second phase rotator 6 to the output of the NCO 10. In addition, there are two outputs of the NCO 10, and these correspond to $\sin \omega t$ and $\cos \omega t$, which differs from each other in their phases by $\pi/2$. The NCO 10 has quite the same constitution as that of the NCO 12, and descriptions are omitted.

The frequency controller 11 outputs frequency waveforms such as triangle waves and sinusoidal waves when the carrier is in an asynchronous state. The frequency controller 11 adjusts its output so that the output of the LPF 9 is smaller than a setting value when the carrier is in a synchronous state.

Figure 4:
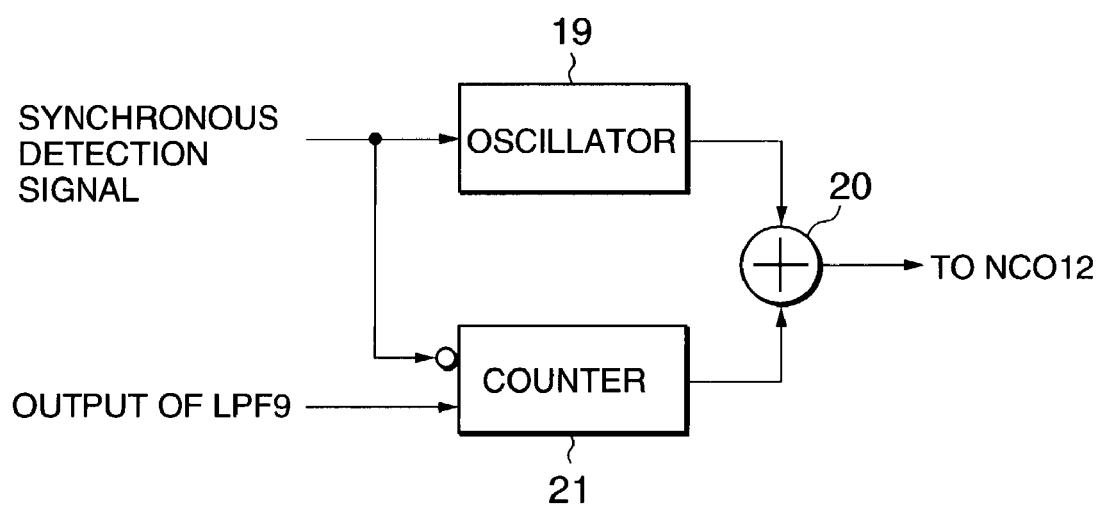
FIG. 4 is a block diagram showing an example of a frequency controller in FIG. 1.

FIG. 4 is a block diagram showing an example of the frequency controller 11. The frequency controller 11 includes an oscillator 19, a counter 21 and an adder 20. The oscillator 19 outputs a periodic waveform signal when it is detected that the input from the synchronous detector 7 is "0", that is, when it is detected that the carrier is in the asynchronous state. The periodic waveform signal from the oscillator 19 is a periodic waveform signal such as sinusoidal wave signal and triangular wave signal. Herein, the oscillator 8 outputs sinusoidal wave signal. It is possible to change the cycle of the periodic waveform signal and the amplitude thereof by setting them. Moreover, when the carrier synchronization is established and the synchronous detector 7 outputs "1", the oscillator 19 fixes its operation and holds the final value of its output.

On the other hand, the counter 21 is constituted by an up and down counter. When the carrier is in the asynchronous state, the counter 21 is reset. And when it is decided that the carrier is in the synchronous state, the counter 21 increases and decreases its count number in accordance with the polarity of the output of the LPF 9 if the output of the LPF 9 exceeds the predetermined setting range. The operation of the counter 21 is continued until the output of the LPF 9 falls within the setting range. The outputs of the oscillator 19 and the counter 21 are added to each other by the adder 20, and the output of the adder 20 is output to the NCO 12.

Next, an operation of the embodiment shown in FIG. 1 will be described. The A/D converter 3 and the synchronous detector 7 are well known, and detailed descriptions for them are omitted. First, the input IF signal is converted to two quadrature components Ich1 and Qch1 by the oscillator 2 and the quadrature detector 1. Herein, since the quadrature demodulator of FIG. 1 adopts a type of a quasi-synchronous demodulator, the carrier wave of the input IF signal and the output of the oscillator 2 are not synchronized with each other.

Figure 5:
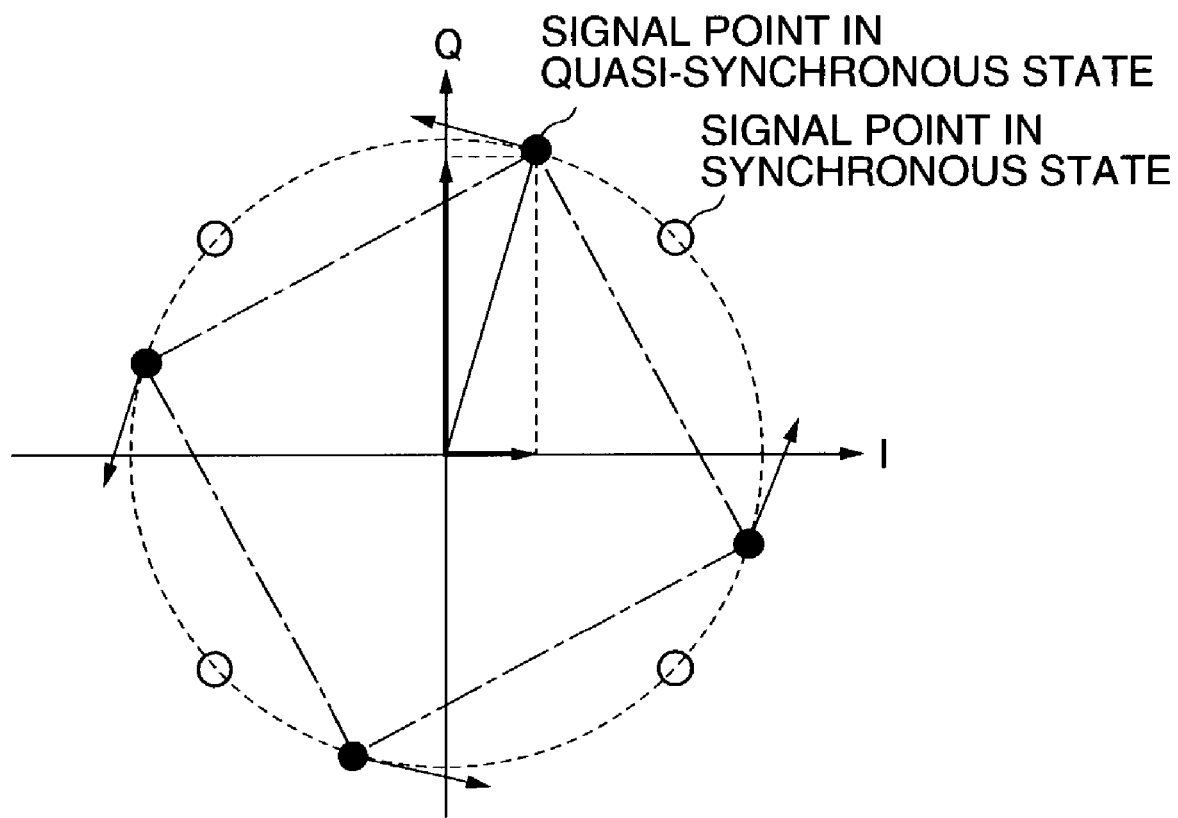
FIG. 5 is a diagram for explaining a phase rotation in a quasi-synchronous state according to a first embodiment shown in FIG. 1.

Accordingly, as shown in FIG. 5, the signal point appearing on the I-Q plane by the two quadrature components Ich1 and Qch1 after the detection rotates in accordance with a difference between the frequency of the carrier wave of the IF signal and the frequency of the oscillator 2. Note that a QPSK system is adopted in FIG. 5. Moreover, in terms of frequencies, the spectrum of Ich1 and Qch1 shifts from the original position by the difference between the carrier wave frequency f of the input IF signal and the output frequency f' of the oscillator 2.

Figure 6:
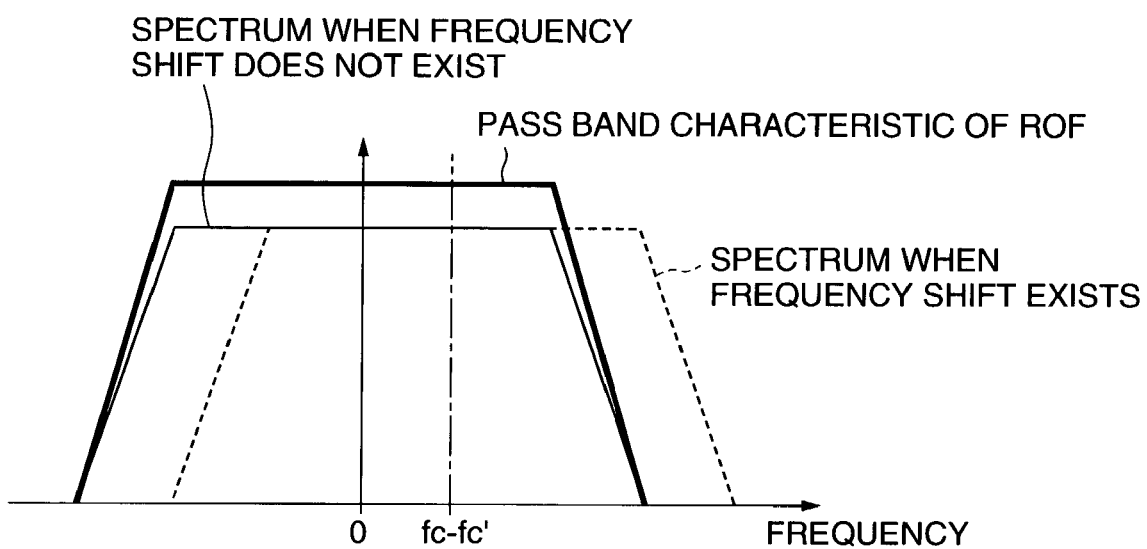
FIG. 6 is a diagram showing spectrums of Ich1 and Qch1 in FIG. 1.

When the carrier synchronization is not established, "0" indicating the asynchronous state is output from the synchronous detector 7. This signal is input to the frequency controller 11, and the oscillator 19 outputs the periodic waveform signal (a triangular wave). When the NCO 12 receives the periodic waveform signal, the NCO 12 sweeps the frequency of the output signal (sinusoidal wave) by a frequency range in accordance with an amplitude of the periodic waveform signal. The sweep described herein means that a central frequency is shifted by a predetermined frequency range in accordance with the amplitude of the oscillator 19 in the right and left directions as shown in FIG. 6.

At this time, the first phase rotator 4 performs the complex multiplication as described above. Then, the base band signal whose central frequency is swept by the first phase rotator 4 transmits through the ROF 5, and is input to the second phase rotator 6. Specifically, since the base band signal always transmits through the pass band of the ROF 5 by the sweeping operation, the base band signal is input to the a carrier recovery PLL circuit including the second phase rotator 6, the PD 8, the LPF 9 and the NCO 10. In the carrier recovery PLL, the phase error detected by the PD 8 transmits through the LPF 9, and is output to the NCO 10. And the NCO 10 outputs a sinusoidal signal which changes its frequency in accordance with the magnitude of the phase error. By performing the complex multiplication similarly to the first phase rotator 4, the second phase rotator 6 performs the phase rotation so as to cancel the phase shift between the input IF signal and the output of the oscillator 2.

Herein, when the carrier synchronization is established, "1" indicating the synchronous state is output from the synchronous detector 7, and the oscillator 19 of the frequency controller 11 stops its operation. Thus, the final output value is retained. Moreover, when the output of the LPF 9 is large in the synchronous state, the spectrum of the base band signal transmitting through the ROF 5 shifts from the pass band. When the output of the LPF 9 departs from the setting range, for correcting the shift of the output of the LPF 9 from the setting range, the counter 21 in the frequency controller 11 continues the up and down-count operations until the output of the LPF 9 falls within the setting range.

In this case, by checking the polarity of the output of the LPF 9 it can be proved to which direction (low or high frequency) the spectrum of the base band signal transmitting through the ROF 5 shifts, and the counter 21 performs either an up-count or a down-count depending on the polarity of the LPF 9. When the output of the LPF 9 is within the setting range in the synchronous state, the output of the frequency controller 11 is fixed, and the output signal of the LPF 9 is not influenced.

Figure 7:
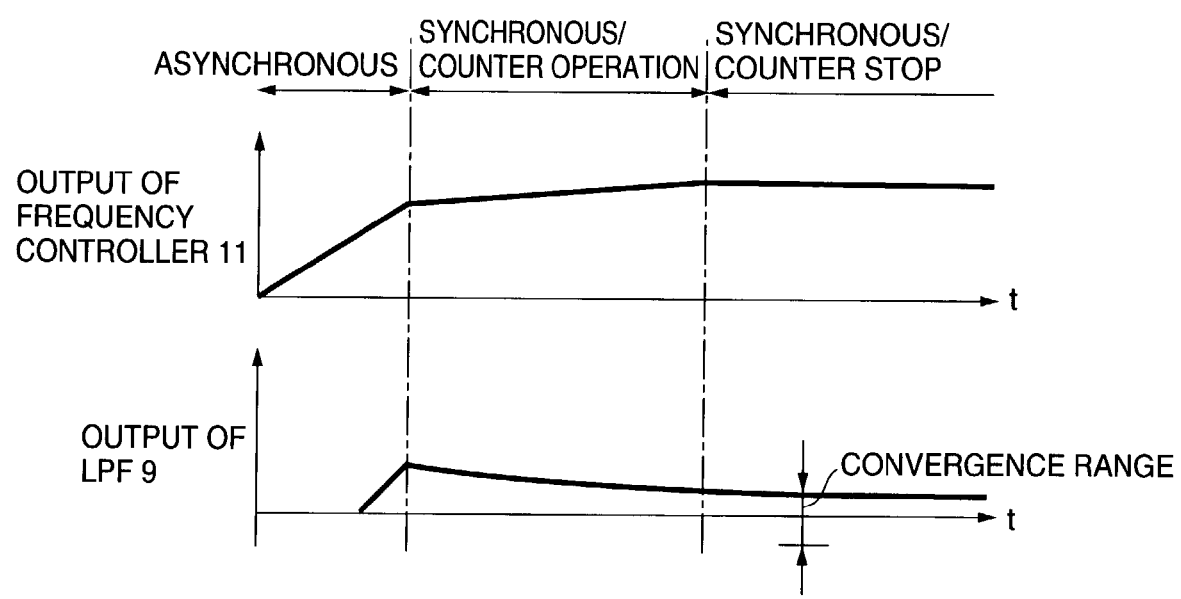
FIG. 7 is a diagram showing outputs of a LPF and a frequency controller until the outputs come to a synchronous state from an asynchronous state according to a first embodiment shown in FIG. 1.

FIG. 7 shows an example of the outputs of the LPF 9 and the frequency controller 11 from the asynchronous state to the synchronous state. In the asynchronous state, the periodic waveform signal is output from the oscillator 19 of the frequency controller 11. In FIG. 7, the case where the synchronous state is brought about at the leading edge of the triangular wave is shown, therefore only a part of the triangular wave is shown. In FIG. 7, when the carrier synchronization is established the output value of the LPF 9 exceeds the convergence range, so the counter 21 of the frequency controller 11 continues to perform the up and down count operations until the output of the LPF 9 falls within the convergence range.

In this embodiment, the first phase rotator 4 is provided at the front stage of the ROF 5, and the central frequency of the base band signal is swept by the first phase rotator 4, so the base band signal is allowed to transmit through the pass band of the ROF 5. Accordingly, it is possible to correct the frequency shift at the front stage of the ROF 5 even if the spectrum of the base band signal shifts by the frequency shift of the oscillator 2. As a result, even if the difference between the frequency of the input IF signal and the frequency of the oscillator 2 is large, deterioration of the bit error rate characteristic can be prevented without attenuating a necessary signal uselessly. Moreover, since the frequency error is automatically detected and corrected, even if the frequency changes due to the changes of temperature and humidity and the like, the frequency change does not affect the characteristics of the quadrature demodulator. Moreover, since the correction of the frequency shift is performed by the digital processing, integration of the quadrature demodulator is possible.

[Second Embodiment]

Figure 8:
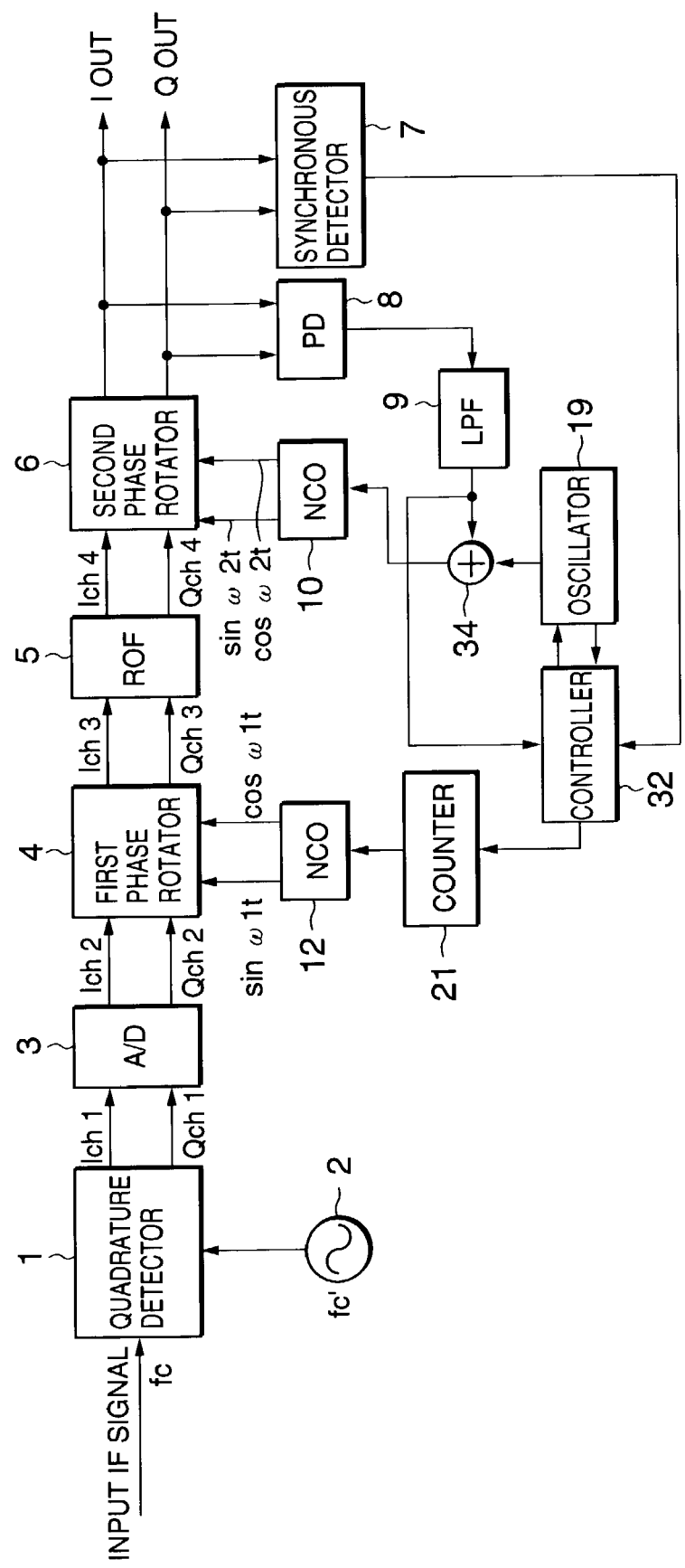
FIG. 8 is a block diagram showing a second embodiment of a quadature demodulator according to the present invention.
Figure 9:
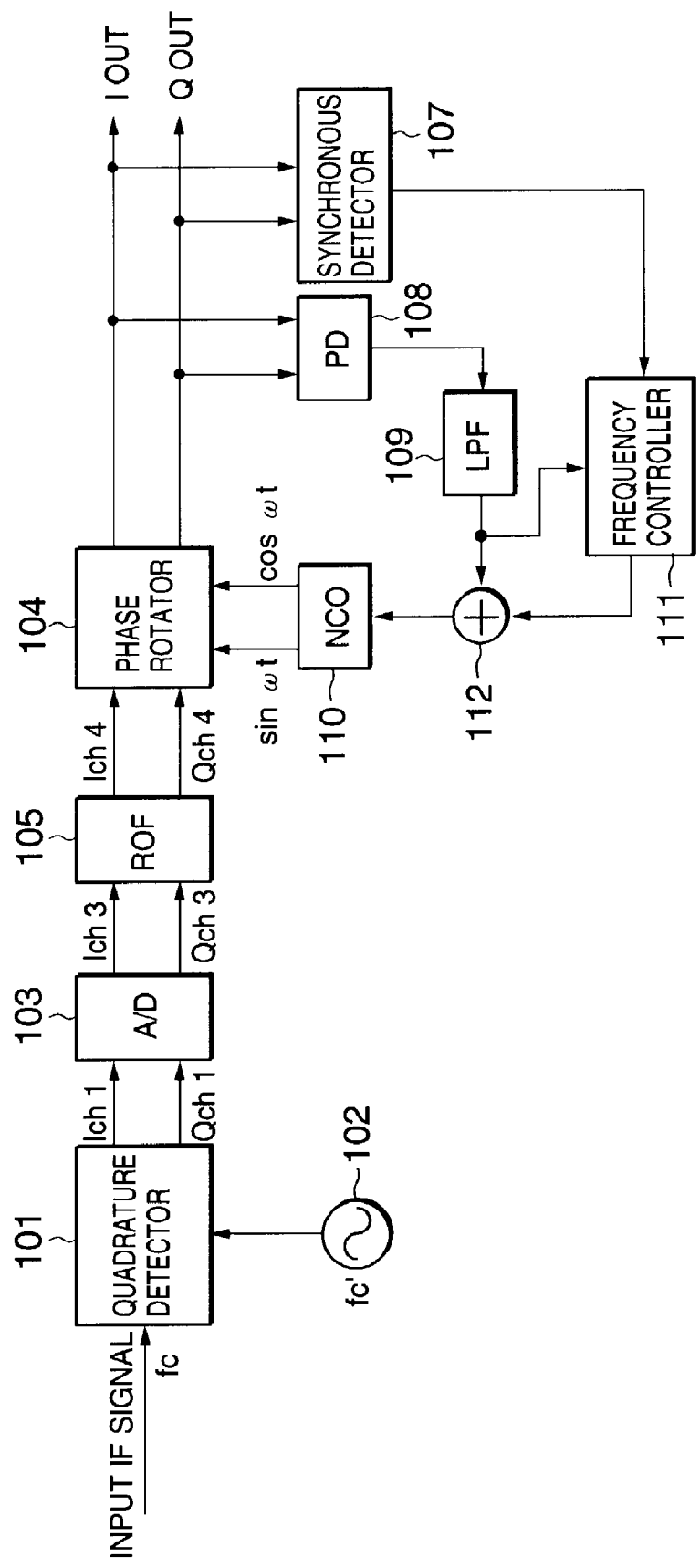
FIG. 9 is a block diagram showing a conventional quadrature demodulator.
Figure 10:
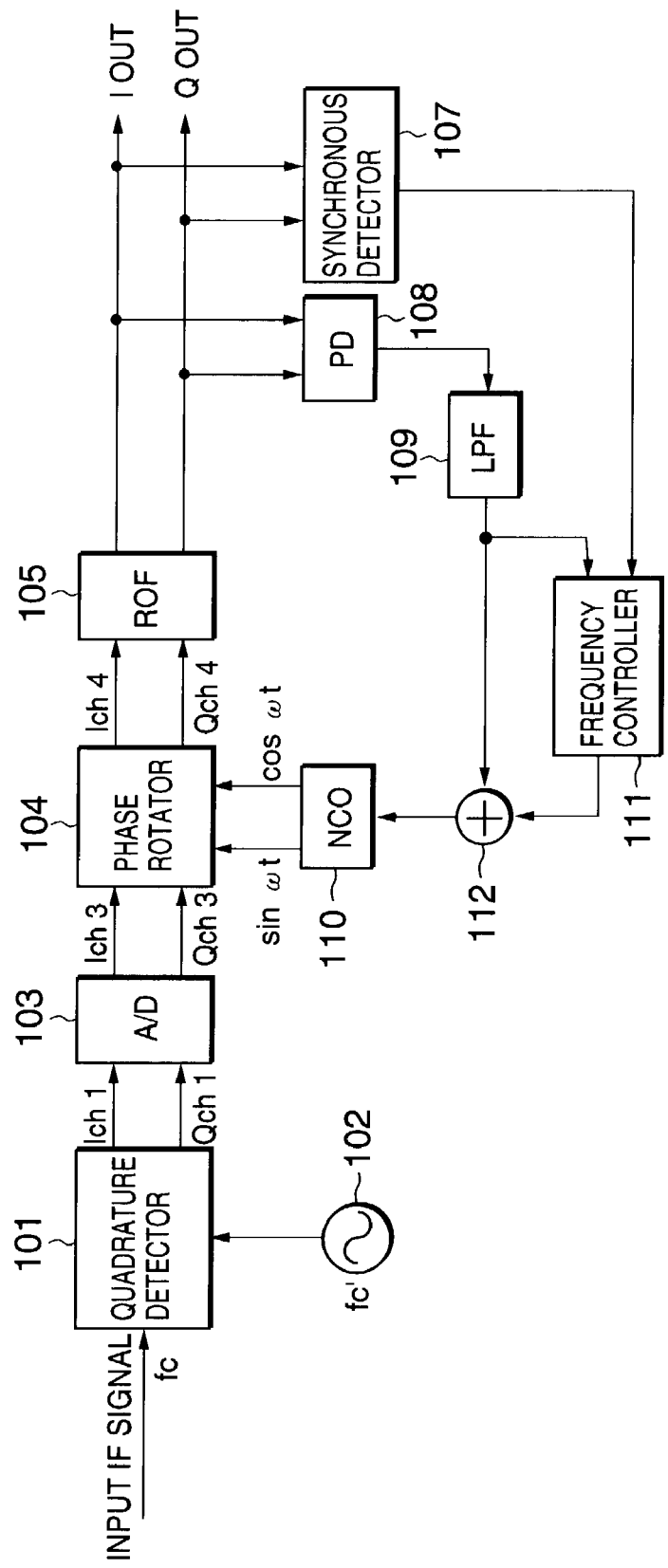
FIG. 10 is a block diagram showing another conventional quadrature demodulator.

FIG. 8 is a block diagram showing a second embodiment of the quadrature demodulator according to the present invention. In FIG. 8, the identical constituent components to those in FIG. 1 are denoted by the same reference numerals, and descriptions for them are omitted. In this embodiment, the oscillator 19 and the counter 21, which are the constituent components of the frequency controller 11 in FIG. 1, are connected to each other via a controller 32, and the output of the oscillator 19 and the output of the LPF 9 are added by the adder 34. The result of the addition is output to the NCO 10, and the output of the counter 21 is output to the NCO 12. The controller 32 is a control circuit for controlling the oscillator 19 and the counter 21. Other constitutions are identical to those of FIG. 1.

When the synchronization detector 7 is outputting the asynchronous decision, the controller 32 controls the oscillator 19 and the counter 21 so that the oscillator 19 outputs the periodic waveform signal and the counter 21 is reset. The oscillator 19 outputs the periodic waveform signal such as a triangular wave and the like, similarly to the first embodiment. Moreover, when the counter 21 is in a reset state, the first phase rotator 4 is in a nonoperative state, and the first phase rotator 4 is in a state where the first phase rotator 4, that is, the input signal is output as it is. At this time, the spectrum of the input base band signal of the second phase rotator 6 is swept by a frequency determined by an amplitude of an output of the oscillator 9. When the carrier synchronization is established during the sweep, it is decided by the synchronous detector 7 that the carrier synchronization is established, and "1" indicating the synchronous state is output to the controller 32. When the carrier synchronization is established, the controller 32 stops the operation of the oscillator 19, and starts an operation to move the last output value of the oscillator 19 at that time to the counter 21.

Specifically, the output of the oscillator 19 is made to be gradually close to zero, and the output of the counter 21 is made to be gradually close to the final value of the oscillator 19. Thus, the central frequency of the base band signal is coincident with the center of the pass band characteristic of the ROF 5, and the base band signal comes to transmit through the pass band of the ROF 5. When it is completed to transfer the output of the oscillator 19 to the counter 21, the output of the LPF 9 is subsequently monitored. If the output of the LPF 9 has a magnitude exceeding the predetermined setting range, the counter 21 performs either a count-up operation or a count-down operation depending on the polarity of the LPF 9, and the counter 21 operates until the output of the LPF 9 falls within the setting range.

In this embodiment, the adjustment of the frequency shift is previously performed by the second phase rotator 6, and the output of the oscillator 19 is made to be zero after the establishment of the carrier synchronization, and the final value of the oscillator 19 is transferred to the counter 21. In other words, by imparting the final value of the oscillator 19 to the NCO 12, the base band signal transmits through the pass band of the ROF 5 similarly to the first embodiment. Accordingly, in this embodiment, even if the spectrum of the base band signal shifts owing to the frequency shift of the oscillator 2, its correction is possible similarly to the first embodiment. Even if the difference between the frequency of the input IF signal and the frequency of the oscillator 2 is large, deterioration of the bit error rate characteristic can be prevented.

Note that in the foregoing embodiments, for removing influences such as interferences in a propagation path of a radio wave, an equalizer and the like may be provided at the rear stage of the second phase rotator 2. Such an equalizer never produces an evil effect on the operations of the present invention.

As described above, according to the present invention, the phase rotator is provided at the front stage of the roll-off filter, and the phase rotation operation of the phase rotator allows the base band signal to transmit through the pass band of the roll-off filter. Therefore, the frequency shift can be corrected even if the spectrum of the base band signal is shifted by the frequency shift of the oscillator. Deterioration of the bit error rate characteristic can be prevented even if the difference between the frequency of the input IF signal and the frequency of the oscillator is large.

What is claimed is:

1. A quadrature demodulator, comprising:
    a quadrature detector for performing a quasi-synchronous detection for a quadrature-modulated input signal;
    a first phase rotator for phase-rotating an output of the quadrature detector;
    a roll-off filter for performing waveform shaping on an output of the first phase rotator;
    a second phase rotator for phase-rotating an output of the roll-off filter;
    a first loop for controlling a phase rotation of the first phase rotator based on an output of the second phase rotator; and
    a second loop for controlling a phase rotation of the second phase rotator based on an output of the second phase rotator.

2. The quadrature demodulator according to claim 1, wherein the first loop controls an output of the quadrature detector by a phase rotation of the first phase rotator so that the output of the quadrature detector transmits through a pass band of the roll-off filter.

3. The quadrature demodulator according to claim 2, wherein the second loop cancels a frequency difference of a reference carrier wave of the quadrature detector and a carrier wave of an input signal by a phase rotation of the second phase rotator.

4. The quadrature demodulator according to claim 2, wherein the first phase rotator receives a signal which changes its frequency by a frequency range in accordance with an amplitude of a periodic waveform signal in a state where a carrier synchronization is not established, and sweeps a central frequency of the output of the quadrature detector, thus allowing the output of the quadrature detector to transmit through a pass band of the roll-off filter.

5. The quadrature demodulator according to claim 3, wherein the first phase rotator receives a signal which changes its frequency by a frequency range in accordance with an amplitude of a periodic waveform signal in a state where a carrier synchronization is not established, and sweeps a central frequency of the output of the quadrature detector, thus allowing the output of the quadrature detector to transmit through a pass band of the roll-off filter.

6. The quadrature demodulator according to claim 4, wherein the amplitude of the periodic waveform signal holds its final value when the carrier synchronization is established.

7. The quadrature demodulator according to claim 5, wherein the amplitude of the periodic waveform signal holds its final value when the carrier synchronization is established.

8. The quadrature demodulator according to claim 4, wherein in a case where a phase error between a reference carrier wave of the quadrature detector and a carrier wave of the input signal is out of a predetermined range when the carrier synchronization is established, the phase error is corrected by the amplitude of the periodic waveform signal so that the phase error is held within said predetermined range.

9. The quadrature demodulator according to claim 5, wherein in a case where a phase error between a reference carrier wave of the quadrature detector and a carrier wave of the input signal is out of a predetermined range when the carrier synchronization is established, the phase error is corrected by the amplitude of the periodic waveform signal so that the phase error is held within said predetermined range.

10. A method for quadrature-demodulating, comprising:
    detecting a quadrature-modulated signal quasi-synchronously;
    first phase-rotating an output of said detecting;
    filtering an output of said first phase-rotating;
    second phase-rotating an output of said filtering;
    first controlling said first phase-rotating based on an output of said second phase-rotating; and
    second controlling said second phase-rotating based on an output of the second phase-rotating.

11. The method of claim 10, wherein said first controlling controls an output of said detecting by a phase rotation so that the output of said detecting transmits through a pass band of the roll-off filter.

12. The method of claim 11, wherein said second controlling cancels a frequency difference of a reference carrier wave of said detecting and a carrier wave of an input signal by a phase rotation of said second phase-rotating.

13. The method of claim 11, wherein said first phase-rotating receives a signal which changes its frequency by a frequency range in accordance with an amplitude of a periodic waveform signal in a state where a carrier synchronization is not established, and sweeps a central frequency of the output of said detecting, thus allowing the output of said detecting to transmit through a pass band of the roll-off filter.

14. The method of claim 12, wherein said first phase-rotating receives a signal which changes its frequency by a frequency range in accordance with an amplitude of a periodic waveform signal in a state where a carrier synchronization is not established, and sweeps a central frequency of the output of said detecting, thus allowing the output of said detecting to transmit through a pass band of the roll-off filter.

15. The method of claim 13, wherein said first controlling holds the final value of the amplitude of the periodic waveform signal when the carrier synchronization is established.

16. The method of claim 14, wherein said first controlling holds the final value of the amplitude of the periodic waveform signal when the carrier synchronization is established.

17. The method of claim 13, wherein in a case where a phase error between a reference carrier wave of said detecting and a carrier wave of the input signal is out of a predetermined range when the carrier synchronization is established, said first controlling corrects the phase error by the amplitude of the periodic waveform signal so that the phase error is held within said predetermined range.

18. The method of claim 14, wherein in a case where a phase error between a reference carrier wave of said detecting and a carrier wave of the input signal is out of a predetermined range when the carrier synchronization is established, said first controlling corrects the phase error by the amplitude of the periodic waveform signal so that the phase error is held within said predetermined range.

19. A quadrature demodulator, comprising:
means for quasi-synchronously detecting received quadrature-modulated input signals;
means for phase-rotating output of the means for quasi-synchronously detecting;
means for waveform shaping on output of the means for phase-rotating output of the means for quasi-synchronously detecting;
means for phase-rotating output of the means for waveform shaping;
means for controlling the means for phase-rotating output of the means for quasi-synchronously detecting based on output of the means for phase-rotating output of the means for waveform shaping; and
means for controlling the means for phase-rotating output of the means for phase-rotating output of the means for waveform shaping based on output of the means for phase rotating output of the means for waveform shaping.

20. The quadrature modulator according to claim 19, wherein the means for controlling the means for phase-rotating output of the means for quasi-synchronously detecting and the means for controlling the means for phase-rotating output of the means for phase-rotating output of the means for waveform shaping each comprise a looped circuit arrangement.

* * * * *